United States Patent [19]

Nigam et al.

[11] Patent Number: 6,117,222

[45] Date of Patent: Sep. 12, 2000

[54] WATER-BASED, WATER-FAST INK COMPOSITIONS CONTAINING A BINDER MATRIX OF A MONOMERIC POLYACID AND A MONOMERIC POLYBASE

[75] Inventors: Asutosh Nigam, Fremont; Subhash Narang, Palo Alto; Sei-ichi Yokoi, Redwood City; Sivapackia Ganapathiappan; Jitender Mohan Khurana, both of Mountain View, all of Calif.

[73] Assignee: SRI International, Menlo Park, Calif.

[21] Appl. No.: 08/972,236

[22] Filed: Nov. 18, 1997

Related U.S. Application Data

[60] Division of application No. 08/733,891, Oct. 18, 1996, Pat. No. 5,885,338, which is a continuation-in-part of application No. 08/420,847, Apr. 11, 1995, Pat. No. 5,973,025, which is a continuation-in-part of application No. 08/225,993, Apr. 12, 1994, abandoned.

[51] Int. Cl.$^7$ .................................................... C09D 11/00
[52] U.S. Cl. ..................................... 106/31.27; 106/31.25; 106/31.28
[58] Field of Search .............................. 106/31.25, 31.27, 106/31.28, 31.43, 31.67, 31.6, 34

[56] References Cited

U.S. PATENT DOCUMENTS

| | | |
|---|---|---|
| 3,864,296 | 2/1975 | Faessinger. |
| 4,551,506 | 11/1985 | Gosselink ................................ 525/417 |
| 5,441,561 | 8/1995 | Chujo et al. . |

FOREIGN PATENT DOCUMENTS

| | | |
|---|---|---|
| 026525 | 9/1979 | Japan. |

*Primary Examiner*—Christopher Henderson
*Attorney, Agent, or Firm*—Dianne E. Reed; J. Elin Hartrum; Reed & Associates

[57] ABSTRACT

Water-based, water-fast ink compositions are provided. The compositions contain an aqueous liquid vehicle, a colorant, e.g., a pigment, dye or stain, and a binder material capable of ionically or physically entrapping the selected colorant. The binder material contains two ionically associated components which form a matrix, and comprises either a combination of a monomeric polyacid and a monomeric polybase, or a combination of a basic polymer and an organic acid.

13 Claims, No Drawings

WATER-BASED, WATER-FAST INK COMPOSITIONS CONTAINING A BINDER MATRIX OF A MONOMERIC POLYACID AND A MONOMERIC POLYBASE

CROSS-REFERENCE TO RELATED APPLICATIONS

This application is a divisional of U.S. patent application Ser. No. 08/733,891, filed Oct. 18, 1996 U.S. Pat. No. 5,885,338, which was a continuation-in-part of U.S. patent application Ser. No. 08/420,847, filed Apr. 11, 1995 U.S. Pat. No. 5,973,025, which was a continuation-in-part of U.S. patent application Ser. No. 08/225,993, filed Apr. 12, 1994, now abandoned.

TECHNICAL FIELD

The present invention relates generally to ink compositions, and more particularly relates to novel water-based, water-fast ink compositions, and to binder materials useful therein.

BACKGROUND

Concern for the environment as well as increasingly stringent regulation of air quality, pollution and hazardous waste has created a need for alternatives to the use of petroleum and petroleum-based products in ink compositions. The primary focus has been on the development of water- and soy-based printing inks. The major reason for using water-based ink compositions is that because organic solvents are not present except in very small quantities, potential problems such as toxicity, flammability and other hazards are minimized.

Traditional water-based inks are based on resin systems which are dispersed in water. Several references describe inks which are based on aqueous vehicles. U.S. Pat. No. 5,106,417 to Hauser et al., for example, describes low viscosity aqueous printing ink compositions based on polyacrylic resins containing carboxyl groups, and which also contain a humectant, pigment and, optionally, a water-dilutable organic solvent. U.S. Pat. No. 5,166,245 to Zuraw et al. describes water-based printing inks made with modified rosin grinding resins. U.S. Pat. No. 5,242,489 to Schwarz, Jr., et al., describes an ink composition containing a polymeric additive in addition to a colorant and an aqueous liquid vehicle. U.S. Pat. No. 5,244,496 to Easton et al. describes a water-fast ink composition containing an amine, an acrylic emulsion resin binder, a triamine dye, and water.

The major drawback of the currently available water-based inks, however, is their generally poor water fastness, which limits their utility.

The present invention is addressed to the aforementioned limitation in the art, and provides a water-based ink composition which is also water-fast. That is, the ink compositions are prepared in water, but after printing and drying become insoluble in water and, depending on the formulation, are also insoluble in alkaline solutions, detergents, and common organic solvents such as alcohols, acetone and toluene.

The novel ink compositions are advantageous in other ways as well. In contrast to many ink compositions of the prior art, the compositions of the invention may be used on a wide variety of substrates, dry quickly after application, and tend not to bleed, smear or rub after drying. The binder materials and colorant are selected so that the colorant is entrapped by the binder matrix, substantially eliminating the possibility that the colorant will leach. In addition, the present ink compositions are generally low in viscosity (and thus relatively easy to work with), display good soak resistance, are generally stable at elevated temperatures, and have a relatively long shelf life, typically on the order of a year or more. It must also be emphasized that the ink compositions may be readily tailored with respect to (1) viscosity, surface tension, dielectric constant and color density by varying the amount or type of components used, and (2) end use, i.e., as continuous jet printing inks, drop-on-demand inks, or the like.

SUMMARY OF THE INVENTION

It is accordingly a primary object of the invention to address the above-mentioned need in the art by providing a water-based ink composition which is also water-fast.

It is another object of the invention to provide such a composition using a novel binder material that serves to entrap the selected colorant.

It is still another object of the invention to provide such a composition wherein the binder material comprises a matrix of two ionically associated components which in combination serve to entrap the selected colorant.

It is a further object of the invention to provide such a composition wherein the binder material comprises a matrix of a monomeric polyacid and a monomeric polybase.

It is still a further object of the invention to provide such a composition wherein the binder matrix comprises a combination of a basic polymer and an organic acid, preferably a monomeric polyacid.

It is yet a further object of the invention to provide such a composition in the form of a jet printing ink.

It is another object of the invention to provide such a composition to provide "drop-on-demand" printing, for example in conjunction with personal computer-associated printers (i.e., "pc printing" compositions).

Additional objects, advantages and novel features of the invention will be set forth in part in the description which follows, and in part will become apparent to those skilled in the art upon examination of the following, or may be learned by practice of the invention.

In a first embodiment, the invention relates to a novel ink composition useful in a variety of printing contexts, e.g., it may be used as a jet printing, pc printing, flexographic, lithographic or screen printing ink. The ink formulation is prepared in water, but is insoluble in water after drying on a substrate.

The binder material of the ink formulation is a novel matrix which comprises a combination of ionically associated components which interact to bind the selected colorant. More specifically, the binder material is a combination of a monomeric polyacid and a monomeric polybase, or a combination of a basic polymer and an organic acid component which may be a monoacid or a polyacid, and may be monomeric or polymeric, but is preferably a monomeric polyacid. The colorant may be a pigment, stain or dye, but in the preferred embodiment herein is a dye having acidic or basic groups.

DETAILED DESCRIPTION OF THE INVENTION

Before the present compounds, compositions and methods are disclosed and described, it is to be understood that the terminology used herein is for the purpose of describing particular embodiments only and is not intended to be limiting.

It must be noted that, as used in the specification and the appended claims, the singular forms "a", "an" and "the" include plural referents unless the context clearly dictates otherwise. Thus, for example, reference to "a polyacid" includes mixtures of two or more polyacids, reference to "a polybase" includes mixtures of two or more polybases, reference to "a colorant" includes mixtures of two or more colorants, reference to "a solvent" includes one or more solvents, and the like. Also, it should be noted that reference to "a mer unit" or "a monomer unit" having a particular generic structure includes reference to two or more mer units which may or may not have the same specific structure.

In this specification and in the claims which follow, reference will be made to a number of terms which shall be defined to have the following meanings:

The term "water-soluble" as used herein to describe the nature of the ink composition prior to drying on a substrate is intended to mean that the composition dissolves virtually completely in water. Generally, this will mean that the solubility of the composition is at least about 0.5 mg/ml in water.

The term "water-fast" as used herein to describe the nature of the ink composition after drying on a substrate is intended to mean that the dried composition is substantially insoluble in water, such that upon contact with water, the dried ink retains at least about 90%, and preferably at least about 95%, of optical density.

The term "biocompatible" to describe the preferred ink compositions of the invention is used to mean that the components of the compositions do not degrade or otherwise adversely affect biological materials in any significant way.

The term "organic solvent" is used herein in its conventional sense to refer to a liquid organic compound, typically a monomeric organic material in the form of a liquid, preferably a relatively nonviscous liquid, the molecular structure of which contains hydrogen atoms, carbon atoms, and optionally other atoms as well, and which is capable of dissolving solids, gases or liquids.

The term "entrap" is used herein to refer to the binding of the colorant by the binder matrix such that after the ink composition dries on a substrate, leaching of colorant from the binder material does not occur. In general, the colorant is physically entrapped by the binder material, i.e., is physically retained by the binder matrix. In some cases, when ionizable or ionized species are present on the colorant, the colorant is ionically bound by the binder matrix as well.

The term "alkyl" as used herein refers to a linear, branched or cyclic saturated hydrocarbon group of 1 to 24 carbon atoms, such as methyl, ethyl, n-propyl, isopropyl, n-butyl, isobutyl, t-butyl, octyl, decyl, tetradecyl, hexadecyl, eicosyl, tetracosyl and the like. Preferred alkyl groups herein contain 1 to 12 carbon atoms, and particularly preferred alkyl groups contain 1 to 8 carbon atoms. The term "lower alkyl" is intended to mean an alkyl group of one to six carbon atoms, preferably one to four carbon atoms.

The term "alkenyl" as used herein refers to a linear, branched or cyclic hydrocarbon group of 2 to 24 carbon atoms containing 1 to 8, typically 1 to 3, double bonds, and includes, for example, ethylene, n-propylene, isopropylene, n-butylene, octylene, cylohexylene, and the like. Preferred alkenyl groups herein contain 2 to 12 carbon atoms, and particularly preferred alkenyl groups contain 2 to 8 carbon atoms. The term "lower alkenyl" is intended to mean an alkenyl group of two to six carbon atoms, preferably two to four carbon atoms.

The term "alkoxy" as used herein refers to an alkyl group bound through an oxygen atom, e.g., methoxy, ethoxy, or the like. The term "lower alkoxy" is intended to mean an alkoxy group of one to six carbon atoms, preferably one to four carbon atoms.

The term "alkylene" as used herein refers to a difunctional saturated branched or unbranched hydrocarbon chain containing from 1 to 24 carbon atoms, and includes, for example, methylene ($-CH_2-$), ethylene ($-CH_2-CH_2-$), propylene ($-CH_2-CH_2-CH_2-$), 2-methylpropylene [$-CH_2-CH(CH_3)-CH_2-$], hexylene [$-(CH_2)_6-$], octylene [$-(CH_2)_8-$] and the like. "Lower alkylene" refers to an alkylene group of 1 to 6, more preferably 1 to 4, carbon atoms.

The term "alkenylene" as used herein refers to a difunctional branched or unbranched hydrocarbon chain containing from 2 to 24 carbon atoms, and 1 to 8, more typically, 1 to 3, double bonds, e.g., propenylene ($-CH_2-CH=CH-$), hexenylene [$-(CH_2)_4-CH=CH-$], octylene [$-(CH_2)_4-CH=CH-(CH_2)_2-$] and the like. "Lower alkenylene" refers to an alkenylene group of 2 to 6, more preferably 2 to 4, carbon atoms.

The term "aryl" is used to refer to a functional group containing one to three aromatic rings. When the aryl group contains two or more aromatic rings, they may be fused, as in naphthalene, anthracene, phenanthrene, or linked, either directly, as in biphenyl, or through a bridge, e.g., an alkylene linkage or a $-(CO)-$ bond, as in benzophenone. The aryl groups herein may or may not be substituted. If substituted there may be one to five substituents on a ring, depending on the structure; generally, an individual aromatic ring, if substituted, will contain one to two substituents, which will typically be lower alkyl, lower alkoxy or hydroxyl substituents.

The prefix "poly-" as in "polyacid" or "polybase" is intended to mean that the compound so designated has two or more acidic groups or two or more basic groups, respectively. Thus, the term "polyacid" herein encompasses a diacid, and the term "polybase" herein encompasses a dibase.

The term "polymer" is used herein in its conventional sense to refer to a compound having two or more monomer units, and is intended to include homopolymers as well as copolymers. The term "monomer" is used herein to refer to compounds which are not polymeric.

"Optional" or "optionally" means that the subsequently described event or circumstance may or may not occur, and that the description includes instances where said event or circumstance occurs and instances where it does not. For example, the phrase "optionally substituted lower alkyl group" means that a lower alkyl group may or may not be substituted and that the description includes both unsubstituted lower alkyl groups and lower alkyl groups where there is substitution.

The aqueous ink compositions of the invention accordingly comprise an aqueous liquid vehicle, an effective amount of a colorant, and a binder material. The binder material comprises two components which are ionically associated to form a matrix, which serves to entrap the colorant as explained above.

In one embodiment, the first component of the binder matrix is a polyacid, and the second component is a polybase. Again, the only limitation on the particular species selected is that the combination provide for complete entrapment of colorant such that there is no leaching after the ink has been applied to and allowed to dry upon a substrate. Generally, it is desirable that the polyacid and polybase be present in a ratio ranging from about 1:5 to 5:1 (wt/wt), preferably from about 1:2 to 2:1 (wt/wt).

The polyacids in this embodiment are represented by structural formula (I)

$$[R_{\overline{w}}(L_{\overline{x}}-COOH)_y]_z \qquad (I)$$

wherein w, x, y, z, L and R are defined as follows.

The substituent R is:

alkyl, including linear, branched and cyclic alkyl, e.g., methyl, ethyl, n-propyl, isopropyl, or the like, substituted with zero to n substituents such as hydroxyl, amino, or lower alkoxy, wherein n will depend on the size of the alkyl group, i.e., on the number of substitutable C—H bonds which are present (thus, linear alkyl groups containing 1 to 8 carbon atoms may be substituted with 2–16 nonhydrogen substituents), but will typically not exceed 6;

alkenyl, including linear, branched and cyclic alkenyl, substituted with zero to n substituents as above, with n generally not exceeding 6;

aryl of 1 to 3 rings which may be fused or linked, and, if linked, the linkage between the aromatic rings may be direct or through a lower alkylene chain, a lower alkenylene chain, or a —(CO)— bond, and both the aromatic rings and the lower alkylene chain, if one is present, may be substituted with one or more hydroxyl groups, amino groups, lower alkyl groups, or combinations thereof, with generally up to 4 substituents on each aromatic ring; or a heterocyclic moiety containing 5 or 6 atoms in the ring and 1 to 3 heteroatoms selected from the group consisting of N, S and O.

L is an optional linking moiety, and if present, will generally be an alkylene or alkenylene chain of 1 to 12, preferably 1 to 8, most preferably 1 to 6, carbon atoms.

The subscripts are as follows: w is 0 or 1; x is 0 or 1; y is an integer which is at least 2, and preferably is in the range of 2 to 10; and z is 1, 2 or 3. When w is 0, then x is 0 and y is necessarily 2 and the compound is oxalic acid. When z is greater than 1, i.e., is 2 or 3, the compound will contain 2 or 3 R groups, respectively, which are as defined above but may be the same or different, and will be linked to one another through a covalent bond, or through an alkylene or alkenylene linkage such as "L", as defined above.

Within this group, preferred polyacids are wherein x is 0, w is 1, y is 2–6, and z is 1—so that the polyacids having the structural formula $R(COOH)_y$—and R is alkyl of 1 to 12 carbon atoms substituted with 0 to 4 substituents, alkenyl of 2 to 12 carbon atoms substituted with 0 to 4 substituents and containing 1 or 2 double bonds, wherein the substituents are amino, hydroxyl, or combinations thereof, or R is aryl of 1 to 2 rings, and if 2 rings, the rings are optionally substituted as explained above and are either fused or linked.

Particularly preferred polyacids within this group are wherein x is 0, w is 1, y is 2, 3 or 4, and z is 1, and R is alkyl of 1 to 8 carbon atoms, alkenyl of 2 to 8 carbon atoms containing one double bond, or phenyl, and if R is alkyl or alkylene, containing 0 to 4 substituents selected from the group consisting of hydroxyl, amino, and combinations thereof.

Examples of polyacids useful to form the binder material in this embodiment thus include oxalic acid, maleic acid, succinic acid, methylsuccinic acid, malonic acid, adipic acid, glutaric acid, fumaric acid, dihydroxyfumaric acid, malic acid, mesaconic acid, itaconic acid, phthalic acid, isophthalic acid, terephthalic acid, 1,2-, 1,3- and 1,4-cyclohexane dicarboxylic acid, 1,2,3-cyclohexane tricarboxylic acid, 1,2,4-cyclohexane tricarboxylic acid, 1,3,5-cyclohexane tricarboxylic acid, 1,2- and 1,3-cyclopentane dicarboxylic acid, pyridine dicarboxylic acid, citric acid, tartaric acid, dihydroxyterephthalic acid, 1,2,3-, 1,2,4- and 1,3,5-benzene tricarboxylic acid, tricarballylic acid, 1,2,4,5-benzene tetracarboxylic acid, norbornene tetracarboxylic acid, 3,3'4,4'-benzophenone tetracarboxylic acid, 1,2,3,4,5,6-benzene hexacarboxylic acid, aspartic acid, glutamic acid, and the like. These polyacids may also be used in combination. Particularly preferred acids are oxalic acid, citric acid, tartaric acid, glutaric acid, benzene tetracarboxylic acids, and benzophenone tetracarboxylic acids.

The polyacids may, if desired, be incorporated into the ink composition in anhydride form, which will readily convert to the free acid upon admixture with the aqueous liquid vehicle.

Similarly, the basic materials in this embodiment contain two or more basic groups, and are preferably polyamines represented by structural formula (II)

$$[R_{\overline{w}}(L_{\overline{x}}-NR^1R^2)_y]_z \qquad (II)$$

wherein R, L, w, x, y and z are as defined above, and $R^1$ and $R^2$ are independently selected from the group consisting of hydrogen and lower alkyl.

Examples of polybases useful to form the binder material in this embodiment thus include the polyamines ethylenediamine, 1,2-propanediamine, 1,3-propanediamine, 1,2,3-triaminopropane, cis-1,2-cyclohexanediamine, trans-1,2-cyclohexanediamine, 1,3-bis(aminomethyl) cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, and mixtures thereof.

In a second embodiment, the binder matrix comprises a combination of a polymeric material having basic groups, either in the polymer backbone, as pendant moieties, or both, with an organic acid component, which may be monomeric or polymeric. As with the embodiment discussed above, the polymeric base and the organic acid ionically associate to form a binder matrix which then physically entraps or ionically binds the selected colorant. The organic acid component may be a monoacid $R^3COOH$ wherein $R^3$ is equivalent to R, defined above, or it may be a polymeric or copolymeric acid such as poly(acrylic acid), poly (acrylonitrile-acrylic acid), poly(styrene-acrylic acid), poly (butadiene-acrylonitrile acrylic acid), poly(butylacrylate-acrylic acid), poly(ethyl acrylate-acrylic acid), poly(acrylic acid-co-maleic acid), poly(ethylenepropylene-acrylic acid), poly(propylene-acrylic acid) or the like. Alternatively, the organic acid component is a monomeric polyacid having the structural formula (I), described in detail above.

The basic polymer in this embodiment is preferably one that has a nitrogenous backbone and/or pendant amine moieties. Preferred polymers are copolymers containing first monomer units having the structure —$CH_2$—$CH_2$—NH— and second monomer units having the structure —$CH_2$—$CH_2$—$R^4$— in which $R^4$ is alkyl of 3 to 8 carbon atoms, lower acyl, or —$(CH_2)_m R^5$ wherein m is an integer in the range of 1 to 10 and $R^5$ is hydroxyl, amino or —$OR^6$ where $R^6$ is $C_1$–$C_4$ alkyl. The second monomer units will generally represent in the range of approximately 20% to 95% of the copolymer, more preferably 40% to 90%, and most preferably 50% to 85%; one example of such a polymer is ethoxylated polyethyleneimine, wherein the percentage of second monomer units (i.e., monomer units having the structure —$CH_2CH_2$—$N(CH_2CH_2OH)$—) in the copolymer represents the degree of ethoxylation. These polymers may be obtained commercially, or they may be synthesized using conventional techniques, e.g., by treating polyethyleneimine with any one of a variety of alkyl or substituted alkyl halides to provide the $R^4$ substituent, in a solvent such as methanol, dimethyl formamide, tetrahydrofuran, or the like.

Other preferred polymers are copolymers containing first monomer units having the structure —$CH_2$—$CH_2$—$NH$—, second monomer units having the structure —$CH_2$—$CH_2$—$NR^4$—, and additional monomer units having the structure —$CH_2$—$CH(COOH)$—. Such a polymer may be synthesized, for example, by copolymerizing aziridine and a suitably substituted aziridine with methyl acrylate, under acidic conditions. Examples of such polymers and associated methods of synthesis are set forth in PCT Publication No. WO95/27759 (Nigam et al., "Water-Based Ink Compositions and Novel Polymers Useful in Conjunction Therewith," published Oct. 19, 1995).

Commercially available basic polymers which may be used include, but are not limited to, polyethyleneimine, polyvinylpyridine, polyallylamine (including N-alkylated and N,N-dialkylated polyallylamines), polyvinylaziridine, polyimidazole, polylysine, chitosan, poly(amino and alkylated amino)ethylenes and ethoxylated polyethyleneimine.

In general, the molecular weight of any polymeric material used in the present ink formulations will be between about 300 and 500,000, and preferably between about 1000 and 300,000, although smaller and larger molecular species may be used depending on the application.

In this latter embodiment, a monomeric polybase as previously described may be incorporated into the composition, so as to form part of the binder matrix along with the polymeric base and the organic acid component. Any of the monomeric polybases encompassed by structural formula (II) may be used.

In either of these embodiments, the ink composition has a pH in the range of approximately 3 to 12.5, preferably in the range of approximately 5 to 10, and most preferably in the range of 7 to 9.5. Although the ink compositions are primarily useful for ink jet printing, they may be used in a variety of other contexts as well, as will be explained below.

The aqueous liquid vehicle will generally be deionized water, although other nonorganic compounds which are either water soluble or water miscible may be included as well. It may be necessary to add a solubilizing compound during preparation of the ink so that the binder components dissolve in the aqueous liquid vehicle, e.g., an inorganic base such as ammonia and/or an organic amine. Suitable organic amines include lower alkyl-substituted amines such as methylamine, dimethylamine, ethylamine, and trimethylamine, as well as ethanolamine, diethanolamine, triethanolamine, and substituted ethanolamines, typically lower alkyl-substituted ethanolamines such as N-methyl and N,N-dimethyl ethanolamines, and morpholine. Such compounds are also useful for bringing the pH into the desired range for basic formulations, and, if present, will generally represent not more than about 20 wt. % of the composition, and in most cases will represent not more than about 10 wt. % of the composition.

The colorant may be any pigment, dye or stain which may be dissolved, dispersed or suspended in the aqueous liquid vehicle and which is effective to provide the dried ink with the desired color and color intensity. The colorant is selected such that it will be immobilized by the binder, either physically or ionically. Preferred colorants are dyes, including azo or "direct" dyes as well as dyes containing acidic groups (e.g., carboxylate, phosphonate or sulfonate moieties), basic groups (e.g., unsubstituted amines or amines substituted with 1 or 2 alkyl, typically lower alkyl, groups), or both. In any case, the colorant and the binder material should be selected so that in combination, the colorant becomes entrapped by the binder.

Specific examples of suitable colorants include, but are not limited to, the following: Dispersol Blue Grains (Zeneca, Inc.), Duasyn Acid Blue (Hoechst Celanese), Duasyn Direct Turquoise Blue (Hoechst Celanese), Phthalocyanine blue (C.I. 74160), Diane blue (C.I. 21180), Pro-jet Cyan 1 (Zeneca, Inc.), Pro-jet Fast Cyan 2 (Zeneca, Inc.), Milori blue (an inorganic pigment equivalent to ultramarine) as cyan colorants; Dispersol Red D-B Grains (Zeneca, Inc.), Brilliant carmine 6B (C.I. 15850), Pro-jet magenta 1 (Zeneca, Inc.), Pro-jet Fast magenta 2 (Zeneca, Inc.), Brilliant Red F3B-SF (Hoechst Celanese), Red 3B-SF (Hoechst Celanese), Acid Rhodamine (Hoechst Celanese), Quinacridone magenta (C.I. Pigment Red 122) and Thioindigo magenta (C.I. 73310) as magenta colorants; Dispersol Yellow D-7G 200 Grains (Zeneca, Inc.), Brilliant yellow (Hoechst Celanese), Pro-jet yellow 1 (Zeneca, Inc.), Pro-jet Fast Yellow 2 (Zeneca, Inc.), benzidine yellow (C.I. 21090 and C.I. 21100) and Hansa Yellow (C.I. 11680) as yellow colorants; organic dyes; and black materials such as carbon black, charcoal and other forms of finely divided carbon, iron oxide, zinc oxide, titanium dioxide, and the like. Specific and preferred black colorants include Acid Black 48 (Aldrich), Direct Black 58756 A (Crompton & Knowles), BPI Molecular Catalytic Gray (Brain Power), Fasday Cool Gray (Hunter Delator), Dispersol Navy XF Grains (Zeneca, Inc.), Dispersol Black CR-N Grains (Zeneca, Inc.), Dispersol Black XF Grains (Zeneca, Inc.), Disperse Black (BASF), Color Black FW18 (Degussa), Color Black FW200 (Degussa), Hostafine Black TS (Hoechst Celanese), Hostafine Black T (Hoechst Celanese), Duasyn Direct Black (Hoechst Celanese), Pro-jet Black 1 (Zeneca, Inc.) and Pro-jet Fast Black 2 (Zeneca, Inc.).

Generally, it is preferred that the colorant be present in an amount ranging from about 0.1 wt. % to about 20 wt. % of the ink composition, more preferably from about 1 wt. % to about 10 wt. % of the ink composition, and most preferably from about 1 wt. % to about 5 wt. % of the ink composition.

The ink compositions of the invention may contain other components as well. It may be preferable in some cases to include a solvent having a relatively high boiling point which can serve as a humectant and solubilizer. Suitable solvents in this regard include, but are not limited to, triacetin, N-methyl-2-pyrrolidone, thiodiethanol, glycerol, diethylene glycol, polyethylene glycol (PEG), propylene carbonate, cyclohexanol, and 2-pyrrolidone. It may also be preferable to include an anti-foaming agent in certain compositions; examples of suitable anti-foaming agents include 1-dodecyl alcohol, Silicon Antifoam 85390 (Fluka), Surfynol DF75 (Air Products), Surfynol DF210 (Air Products), Carboflow 32W (B.F. Goodrich), Tego Airex 900 (TegoChemie USA), TegoFoamex 1488 (TegoChemie USA), Siliconantifoamer S670 (Wacker) and Foam Blast 338 (Ross Chemicals). Other additives include surface tension control agents such as anionic and nonionic surface active agents, preservatives and biocides, and viscosity modifiers, as will be discussed in further detail below.

Finally, it may also be preferred in some cases to include polyethylene glycol, or alkyl or thiol derivatives thereof, when the composition is formulated for jet printing. PEG not only serves as a humectant and solubilizer, as alluded to above, but also lowers surface tension, improves water fastness, and reduces the likelihood that the ink will dry on the jet printing nozzle. When PEG is included in the ink formulation, it should represent on the order of 0.1 to 20 wt. % of the formulation, more preferably 0.1 to 10 wt. % of the formulation, and most preferably approximately 6.0 wt. %.

For jet printing inks, the binder, colorant and water will in combination generally represent at least about 65 wt. % of the composition, and in most cases at least about 80 wt. % of the composition. Also, the composition may in some cases contain monomeric organic solvents, e.g., lower alcohols or the like. Any such solvents will be present in an amount that is typically less than about 20 wt. %, of the ink composition. Certain monomeric solvents which are used in preparation of the composition may physically or chemically interact with the binder material so as to form part of the binder/colorant matrix which forms the substance of the dried ink composition. Examples of such solvents include N,N'-dimethylethanolamine, triethanolamine, diethanolamine, and the like.

The ink compositions may be prepared in any number of ways, as will be appreciated by those working in the field of printing ink chemistry and ink manufacturing technology. A preferred method for formulating the ink compositions, however, involves first dispersing the selected colorant in deionized water (or obtaining a predispersed colorant/water admixture), followed by admixture with a solution of the selected binder material components in water. As explained above, a solubilizing agent may be necessary to effect dissolution. This step is followed by incorporation of additives such as humectant, anti-foaming agent, surface tension control agents, and the like. This admixture is then stirred and mixed in either a fine ball mill or an emulsifier mixer, and filtered to achieve a particle size of less than about 5 $\mu$m, preferably less than about 1 $\mu$m, in diameter.

The ink compositions of the invention may be used as jet printing inks, flexographic inks, lithographic inks, screen printing inks, or the like. Depending on the desired utility, the viscosity of the ink composition will need to be adjusted by varying the concentration of binder material and colorant. The preferred viscosity for a composition to be used in continuous ink jet printing is in the range of approximately 1.0 to 15 cP, more preferably in the range of approximately 1.5 to 10 cP, and most preferably in the range of approximately 3 to 5 cP.

For "drop-on-demand" printing, e.g., in pc printers (including bubble jet and piezoelectric systems), viscosity considerations are somewhat different than for other end uses, insofar as lower viscosities are generally preferred, typically less than about 2.5 cP, preferably less than about 2.0 cP, and most preferably in the range of about 1.0 to 2.0 cP. Also, any components selected for use in pc printing ink compositions should be thermally stable, as they are subjected to higher temperatures, in general, than other types of inks. Finally, pc printing inks may involve a different pH range than other types of ink compositions, and should be substantially chloride-free to avoid corrosive effects.

As explained in U.S. Pat. No. 5,106,417 to Hauser et al., viscosity may be adjusted using any known substances so long as those materials do not adversely affect the ink composition and the substrate on which the composition is ultimately applied. Suitable viscosity control agents include, for example, polyvinyl alcohol, hydroxylpropyl cellulose, methyl cellulose, water soluble acrylic resins and polyvinylpyrrolidone.

The ink compositions of the invention are not intended to be limited to use on particular substrates. The present compositions are in fact quite versatile insofar as they may be used on paper, plastic, metal, ceramics, and the like. In some cases, for example with a number of plastic materials, it may be necessary to pretreat the surface on which the ink is to be applied so that it is rendered hydrophilic, i.e., such that carboxyl or other ionized groups are provided thereon.

Experimental

The practice of the present invention will employ, unless otherwise indicated, conventional techniques of synthetic organic chemistry, polymerization, ink manufacture, and the like, which are within the skill of the art. Such techniques are explained fully in the literature. See, e.g.: Kirk-Othmer, *Encyclopedia of Chemical Technology* (New York: John-Wiley & Sons, latest edition); House, *Modern Synthetic Reactions* (Menlo Park, Calif.: The Benjamin/Cummings Publishing Company, 1972); and Odian, *Principles of Polymerization*, Second Edition (New York: John Wiley & Sons, 1981). All patents and publications mentioned herein are incorporated by reference.

It is to be understood that while the invention has been described in conjunction with the preferred specific embodiments thereof, the description above as well as the examples which follow are intended to illustrate and not limit the scope of the invention. Other aspects, advantages and modifications within the scope of the invention will be apparent to those skilled in the art to which the invention pertains.

In the following examples, efforts have been made to insure accuracy with respect to numbers used (e.g., amounts, temperature, etc.) but some experimental error and deviation should be allowed for. Unless indicated otherwise, temperature is in degrees Centigrade and pressure is at or near atmospheric.

Starting materials were obtained as follows: citric acid, tartaric acid, 1,2,4-benzenetricarboxylic acid, 3,3',4,4'-benzophenone tetracarboxylic dianhydride, triethylenetetramine, triethanolamine, methylamine, dimethylamine, trimethylamine, ethylamine, pentamethyl diethylenetriamine, hexamethyl triethylenetetramine, ethanolamine, 3-amino-1,2-propanediol, propanolamine, diethanolamine, N,N-dimethylethanolamine, polyethyleneimine, ethoxylated polyethyleneimine, N-methyl-2-pyrrolidone, 2-pyrrblidone, propylene carbonate, polyethylene glycol, diethylene glycol, thiodiethanol, from Aldrich; Carboset® polymers (e.g., Carboset® GA1594 poly(acrylic acid)), from B.F. Goodrich; Carboflow®, from B.F. Goodrich; Duasyn Direct dyes (including those designated "HEF-SF") and Hostafine dyes, from Hoechst Celanese; and Projet dyes, from Zeneca.

EXAMPLE 1

A dye-based ink composition according to the invention was prepared as follows. A mixture of 1,2,4-benzenetricarboxylic acid (8 g) and 60 mL of 10% solution of triethylenetetramine were stirred together for 2 hours. Duasyn Direct black dye (2.8 g) was then added to the solution and stirring was continued until all components dissolved. Triethanolamine (10 mL) and N-methyl-2-pyrrolidone (10 mL) were also added. The resultant composition showed very good water fastness and no bleeding by spotting on plain paper.

Analogous formulations were prepared by replacing triethanolamine with ethanolamine, diethanolamine and morpholine. These also were found to have very good water fastness after drying on plain paper, and did not display any bleeding.

EXAMPLE 2

A dye-based ink composition according to the invention was prepared as follows. Triethylenetetramine (4 g) was dissolved in 40 mL of water and Duasyn Direct black dye (4 g) was added. The contents were stirred until the dye dissolved. Citric acid (4 g) was dissolved separately in 20 mL of water with stirring and added to the triethylene tetramine solution. A solid separated out which dissolved upon stirring. To this solution N-methyl pyrrolidone (5–10%) and triethanolamine (5–10%) were added and the stirring continued. The composition showed very good water fastness after spotting on paper. The ink was filtered through 5.0 and 1.2 μm filters and printed on plain paper using a Hewlett-Packard 550C Desk Jet printer.

Analogous formulations were prepared by replacing triethanolamine with ethanolamine, diethanolamine, (±)-1-amino-2,3-propanediol and morpholine. These ink formulations were also found to have excellent water fastness and did not bleed after spotting on plain paper.

EXAMPLE 3

A dye-based ink composition according to the invention was prepared as follows. Tartaric acid (4 g) was dissolved in 20 mL of deionized water. In a separate beaker, triethylenetetramine (4 g) was dissolved in 40 mL of deionized water with stirring. To this was added 4 g of Duasyn Direct black dye and the stirring continued until the dye had dissolved. The tartaric acid solution was then added and stirring was continued. N-methyl-2-pyrrolidone (5%) and triethanolamine (5%) were also added. As with the preceding formulation, this ink was tested by spotting on paper and then printing using an Hewlett-Packard 550C Desk Jet printer.

Analogous formulations were prepared by replacing triethanolamine by ethanolamine, diethanolamine, morpholine and (±)-1-amino-2,3-propanediol. Inks so prepared displayed very good water fastness and did not bleed after application to plain paper.

EXAMPLE 4

A dye-based ink composition according to the invention was prepared as follows. Four g of 3,3',4,4'-benzophenone tetracarboxylic dianhydride were placed in 30 mL of water and stirred, followed by dropwise addition of aqueous ammonia until the anhydride dissolved completely. Duasyn Direct black dye (Hoechst Celanese, 5 g) was added, and the solution was stirred. Triethylenetetramine (2 g) was dissolved separately in 10 mL of water. The two solutions were mixed. N-methyl-pyrrolidone (8 mL) and triethanolamine (8 mL) were added and the contents stirred at room temperature. The total volume of the solution was made up to 100 mL by further addition of water. This was filtered through 5 and 1.2 μm filters. This composition was tested by spotting on plain paper and printing on plain paper using a Hewlett-Packard 550C Desk Jet printer. The ink displayed excellent water fastness and no bleeding.

This experiment was repeated by replacing ammonia with methylamine, dimethylamine, trimethylamine, ethylamine, ethanolamine, 3-amino-1,2-propanediol, propanolamine and diethanolamine, giving rise to comparable water-fast ink compositions.

EXAMPLE 5

A dye-based ink composition according to the invention was prepared as follows. A mixture of polyethyleneimine, $M_w$ 750,000 (2.5 g) and 1,2,4-benzenetricarboxylic acid (5 g) were mixed with 40 mL of water and stirred at room temperature. The two did not dissolve in water and formed an opaque dispersion. The dispersion was treated with ammonia and became a clear solution after stirring for 10–15 minutes. Duasyn Direct black dye (4 g) and N-methyl-2-pyrrolidone (5 mL) were added along with deionized water until the total volume was approximately 80 mL. The contents were then stirred at room temperature. This formulation displayed very good water fastness by spotting on plain paper.

Analogous formulations were prepared using polyethyleneimines of varying molecular weights, i.e., $M_w$ 700, 2,000, 5,000 and 25,000, and by replacing ammonia with methylamine, dimethylamine, ethanolamine, diethanolamine and morpholine. All of these formulations displayed good water fastness after drying on plain paper.

EXAMPLE 6

A dye-based ink composition according to the invention was prepared as follows. Polyethyleneimine, $M_w$ 750,000 (4 g) was dissolved in 40 mL of deionized water and 4 g Duasyn Direct Black dye added after the polyethyleneimine had dissolved. The mixture was stirred at room temperature. 3,3',4,4'-Benzophenone tetracarboxylic dianhydride (4 g) was mixed with 20 mL of water in a beaker and ammonia was added until the anhydride dissolved completely. The two solutions were mixed and another 20 mL of water was added, followed by further stirring at room temperature. N-methyl pyrrolidone (5–10%) and ethylene glycol (2%) were also added. After spotting on plain paper, the ink formulation displayed very good water fastness.

Analogous formulations were prepared using polyethyleneimines of varying molecular weight, e.g., $M_w$ 7009 2000, 5000 and 25,000, and by replacing ammonia with methylamine, dimethylamine, ethanolamine, diethanolamine, triethanolamine and morpholine. Ink formulations were obtained having equivalent water fastness to that described above.

EXAMPLE 7

An ink composition according to the invention was prepared by admixing 1.25 g polyacrylic acid with 8.75 g deionized water, and adjusting the pH of the admixture to 10 using ammonium hydroxide. 0.32 g of polyethyleneimine predissolved in 12 g deionized water was added to the resin/water solution. Seven drops Hostafine Black TS pigment was then added and the mixture stirred. The ink was then used to write on white paper, allowed to dry for five minutes, and tested for fastness as in the preceding examples. The dried ink was found to be insoluble in all of the liquids tested, including water, toluene, acetone, isopropyl alcohol, and detergent solution (pH 8).

EXAMPLES 8–28

Black ink formulations were prepared using the following general procedure:

The indicated amount of 3,3',4,4'-benzophenone tetracarboxylic acid dianhydride was dissolved in the selected solvent (triethanolamine or N,N-dimethyl-ethanolamine) and 30 mL of water by stirring the mixture at room temperature. The amine or imine was added, along with N-methyl-2-pyrrolidone and other components as indicated. Water was added to make up the volume to 100 mL. Stirring was continued at room temperature and the dye was added after 2 hours. The mixture was thereafter stirred at room temperature overnight for approximately 24 hours. The ink composition so prepared was then spotted on paper and tested for water fastness. The composition was then filtered through 10 μm and 1 μm filter papers, loaded into a cartridge pen and test printed on different kinds of paper.

| Ex. | | | |
|---|---|---|---|
| 8. | 3,3',4,4'-Benzophenone tetra-carboxylic dianhydride | = | 4 g |
|  | Pentamethyl diethylenetriamine | = | 2 g |
|  | Triethanolamine | = | 10 mL |
|  | N-Methyl-2-pyrrolidone | = | 5 mL |
|  | Duasyn Direct Black Dye (HEF-SF) | = | 3 g |
|  | Total Volume with Water | = | 100 mL |
| 9. | 3,3',4,4'-Benzophenone tetra-carboxylic dianhydride | = | 4 g |
|  | Hexamethyl triethylenetetramine | = | 2 g |
|  | Triethanolamine | = | 10 mL |
|  | N-Methyl-2-pyrrolidone | = | 5 mL |
|  | Duasyn Direct Black Dye (HEF-SF) | = | 3 g |
|  | Total Volume with Water | = | 100 mL |
| 10. | 3,3',4,4'-Benzophenone tetra-carboxylic dianhydride | = | 4 g |
|  | Pentamethyl diethylenetriamine | = | 2 g |
|  | N,N-Dimethylethanolamine | = | 10 mL |
|  | N-Methyl-2-pyrrolidone | = | 5 mL |
|  | Duasyn Direct Black Dye (HEF-SF) | = | 3 g |
|  | Total Volume with Water | = | 100 mL |
| 11. | 3,3',4,4'-Benzophenone tetra-carboxylic dianhydride | = | 4 g |
|  | Hexamethyl triethylenetetramine | = | 2 g |
|  | N,N-Dimethylethanolamine | = | 10 mL |
|  | N-Methyl-2-pyrrolidone | = | 5 mL |
|  | Duasyn Direct Black Dye (HEF-SF) | = | 3 g |
|  | Total Volume with Water | = | 100 mL |
| 12. | 3,3',4,4'-Benzophenone tetra-carboxylic dianhydride | = | 4 g |
|  | Pentamethyl diethylenetriamine | = | 1.8 g |
|  | Polyethyleneimine (MW 700 or 2000) | = | 0.2 g |
|  | N,N-Dimethylethanolamine | = | 10 mL |
|  | N-Methyl-2-pyrrolidone | = | 5 mL |
|  | Duasyn Direct Black Dye (HEF-SF) | = | 3 g |
|  | Total Volume with Water | = | 100 mL |

(Examples 12a–d: The formulation of Example 12 was prepared substituting diethylenetriamine (Example 12a), triethylenetetramine (Example 12b), tetraethylenepentamine (Example 12c) and pentaethylenehexamine (Example 12d) in place of polyethyleneimine.)

| 13. | 3,3',4,4'-Benzophenone tetra-carboxylic dianhydride | = | 4 g |
|---|---|---|---|
|  | Hexamethyl triethylenetetramine | = | 1.8 g |
|  | Polyethyleneimine | = | 0.2 g |
|  | N,N-Dimethylethanolamine | = | 10 mL |
|  | N-Methyl-2-pyrrolidone | = | 10 mL |
|  | Polyethylene glycol | = | 10 g |
|  | Duasyn Direct Black Dye (HEF-SF) | = | 3 g |
|  | Total Volume with Water | = | 100 mL |
| 14. | 3,3',4,4'-Benzophenone tetra-carboxylic dianhydride | = | 4 g |
|  | Pentamethyl diethylenetriamine | = | 1.8 g |
|  | Polyethyleneimine | = | 0.2 g |
|  | N,N-Dimethylethanolamine | = | 10 mL |
|  | N-Methyl-2-pyrrolidone | = | 10 mL |
|  | Polyethylene glycol | = | 10 g |
|  | Duasyn Direct Black Dye (HEF-SF) | = | 3 g |
|  | Total Volume with Water | = | 100 mL |

(Examples 14a–d: The formulation of Example 14 was prepared substituting diethylenetriamine (Example 14a), triethylenetetramine (Example 14b), tetraethylenepentamine (Example 14c) and pentaethylenehexamine (Example 14d) in place of pentamethyl diethylenetriamine.)

| 15. | 3,3',4,4'-Benzophenone tetra-carboxylic dianhydride | = | 4 g |
|---|---|---|---|
|  | Pentamethyl diethylenetriamine | = | 2.0 g |
|  | N,N-Dimethylethanolamine | = | 10 mL |
|  | N-Methyl-2-pyrrolidone | = | 10 mL |
|  | Polyethylene glycol | = | 10 g |
|  | Duasyn Direct Black Dye (HEF-SF) | = | 3 g |
|  | Total Volume with Water | = | 100 mL |
| 16. | 3,3',4,4'-Benzophenone tetra-carboxylic dianhydride | = | 4 g |
|  | Hexamethyl triethylenetetramine | = | 2.0 g |
|  | N,N-Dimethylethanolamine | = | 10 mL |
|  | N-Methyl-2-pyrrolidone | = | 10 mL |
|  | Polyethylene glycol | = | 10 g |
|  | Duasyn Direct Black Dye (HEF-SF) | = | 3 g |
|  | Total Volume with Water | = | 100 mL |

(Examples 16a–d: The formulation of Example 16 was prepared substituting diethylenetriamine (Example 16a), triethylenetetramine (Example 16b), tetraethylenepentamine (Example 16c) and pentaethylenehexamine (Example 16d) in place of hexamethyl triethylenetetramine.)

| 17. | 3,3',4,4'-Benzophenone tetra-carboxylic dianhydride | = | 4 g |
|---|---|---|---|
|  | Hexamethyl triethylenetetramine | = | 2.0 g |
|  | N,N-Dimethylethanolamine | = | 10 mL |
|  | N-Methyl-2-pyrrolidone | = | 5 mL |
|  | Polyethylene glycol | = | 10 g |
|  | Diethylene glycol | = | 10 g |
|  | Duasyn Direct Black Dye (HEF-SF) | = | 3 g |
|  | Total Volume with Water | = | 100 mL |
| 18. | 3,3',4,4'-Benzophenone tetra-carboxylic dianhydride | = | 4 g |
|  | Pentamethyl diethylenetriamine | = | 2.0 g |
|  | N,N-Dimethylethanolamine | = | 10 mL |
|  | N-Methyl-2-pyrrolidone | = | 5 mL |
|  | Polyethylene glycol | = | 10 g |
|  | Diethylene glycol | = | 10 g |
|  | Duasyn Direct Black Dye (HEF-SF) | = | 3 g |
|  | Total Volume with Water | = | 100 mL |

(Examples 18a–18d: The formulation of Example 18 was prepared substituting diethylenetriamine (Example 18a), triethylenetetramine (Example 18b), tetraethylenepentamine (Example 18c) and pentaethylenehexamine (Example 18d) in place of pentamethyl diethylenetriamine.)

| 19. | 3,3',4,4'-Benzophenone tetra-carboxylic dianhydride | = | 4 g |
|---|---|---|---|
|  | Pentamethyl diethylenetriamine | = | 2.0 g |
|  | N,N-Dimethylethanolamine | = | 10 mL |
|  | N-Methyl-2-pyrrolidone | = | 5 mL |
|  | Polyethylene glycol | = | 10 g |
|  | Diethylene glycol | = | 10 g |
|  | Propylene carbonate | = | 2 g |
|  | Biocide | = | 0.1 g |
|  | Duasyn Direct Black Dye (HEF-SF) | = | 3 g |
|  | Total Volume with Water | = | 100 mL |
| 20. | 3,3',4,4'-Benzophenone tetra-carboxylic dianhydride | = | 4 g |
|  | Hexamethyl triethylenetetramine | = | 2.0 g |
|  | N,N-Dimethylethanolamine | = | 10 mL |
|  | N-Methyl-2-pyrrolidone | = | 5 mL |
|  | Polyethylene glycol (MW 200, 400 or 600) | = | 10 g |
|  | Diethylene glycol | = | 10 g |

|     |                              |   |         |
| --- | ---------------------------- | - | ------- |
|     | Propylene carbonate          | = | 2 g     |
|     | Biocide                      | = | 0.1 g   |
|     | Triacetin                    | = | 1 g     |
|     | Duasyn Direct Black Dye (HEF-SF) | = | 3 g |
|     | Total Volume with Water      | = | 100 mL  |

(Examples 20a–20d: The formulation of Example 20 was prepared substituting diethylenetriamine (Example 20a), triethylenetetramine (Example 20b), tetraethylenepentamine (Example 20c) and pentaethylenehexamine (Example 20d) in place of hexamethyl triethylenetetramine.)

|     |                              |   |         |
| --- | ---------------------------- | - | ------- |
| 21. | 3,3',4,4'-Benzophenone tetra-carboxylic dianhydride | = | 3.8 g |
|     | Pentamethyl diethylenetriamine | = | 2.0 g |
|     | Carboset GA 1594             | = | 0.2 g   |
|     | N,N-Dimethylethanolamine     | = | 10 mL   |
|     | N-Methyl-2-pyrrolidone       | = | 5 mL    |
|     | Duasyn Direct Black Dye (HEF-SF) | = | 3 g |
|     | Total Volume with Water      | = | 100 mL  |
| 22. | 3,3',4,4'-Benzophenone tetra-carboxylic dianhydride | = | 3.8 g |
|     | Hexamethyl triethylenetetramine | = | 2.0 g |
|     | Carboset GA 1594             | = | 0.2 g   |
|     | N,N-Dimethylethanolamine     | = | 10 mL   |
|     | N-Methyl-2-pyrrolidone       | = | 5 mL    |
|     | Duasyn Direct Black Dye (HEF-SF) | = | 3 g |
|     | Total Volume with Water      | = | 100 mL  |

(Examples 22a–d: The formulation of Example 22 was prepared substituting diethylenetriamine (Example 22a), triethylenetetramine (Example 22b), tetraethylenepentamine (Example 22c) and pentaethylenehexamine (Example 22d) in place of hexamethyl triethylenetetramine.)

|     |                              |   |         |
| --- | ---------------------------- | - | ------- |
| 23. | 3,3',4,4'-Benzophenone tetra-carboxylic dianhydride | = | 4 g |
|     | Polyethyleneimine, ethoxylated | = | 2 g   |
|     | N,N-Dimethylethanolamine     | = | 10 mL   |
|     | Polyethylene glycol          | = | 10 g    |
|     | N-Methyl-2-pyrrolidone       | = | 10 mL   |
|     | Projet Black 2               | = | 65 mL   |
|     | Total Volume with Water      | = | 100 mL  |
| 24. | 3,3',4,4'-Benzophenone tetra-carboxylic dianhydride | = | 4 g |
|     | Polyethyleneimine, ethoxylated | = | 2 g   |
|     | N,N-Dimethylethanolamine     | = | 10 mL   |
|     | N-Methyl-2-pyrrolidone       | = | 5 mL    |
|     | Polyethylene glycol          | = | 10 g    |
|     | Diethylene glycol            | = | 10 g    |
|     | Projet Black 2               | = | 65 mL   |
|     | Total Volume with Water      | = | 100 mL  |
| 25. | 3,3',4,4'-Benzophenone tetra-carboxylic dianhydride | = | 4 g |
|     | Polyethyleneimine, ethoxylated | = | 2 g   |
|     | N,N-Dimethylethanolamine     | = | 10 mL   |
|     | N-Methyl-2-pyrrolidone       | = | 5 mL    |
|     | Polyethylene glycol          | = | 10 g    |
|     | Diethylene glycol            | = | 10 g    |
|     | Propylene carbonate          | = | 2 g     |
|     | Projet Black 2               | = | 65 mL   |
|     | Total Volume with Water      | = | 100 mL  |
| 26. | 3,3',4,4'-Benzophenone tetra-carboxylic dianhydride | = | 4 g |
|     | Polyethyleneimine, ethoxylated | = | 2 g   |
|     | Ammonia                      | = | 5 mL    |
|     | 2-Pyrrolidone                | = | 9 g     |
|     | Thiodiethanol                | = | 9 g     |
|     | Cyclohexanol                 | = | 2 g     |
|     | Projet Black 2               | = | 65 mL   |
|     | Total Volume with Water      | = | 100 mL  |
| 27. | 3,3',4,4'-Benzophenone tetra-carboxylic dianhydride | = | 4 g |
|     | Polyethyleneimine, ethoxylated | = | 2 g   |
|     | Ammonia                      | = | 5 mL    |
|     | 2-Pyrrolidone                | = | 9 g     |
|     | Diethylene glycol            | = | 9 g     |
|     | Cyclohexanol                 | = | 2 g     |
|     | Projet Black 2               | = | 65 mL   |
|     | Total Volume with Water      | = | 100 mL  |
| 28. | 3,3',4,4'-Benzophenone tetra-carboxylic dianhydride | = | 4 g |
|     | Polyethyleneimine, ethoxylated | = | 2 g   |
|     | Ammonia                      | = | 5 mL    |
|     | N-Methyl-2-pyrrolidone       | = | 9 g     |
|     | Thiodiethanol                | = | 9 g     |
|     | Cyclohexanol                 | = | 2 g     |
|     | Projet Black 2               | = | 65 mL   |
|     | Total Volume with Water      | = | 100 mL  |

All of the ink formulations prepared in these examples were found to have very good water fastness after drying on plain paper, and did not display any bleeding.

EXAMLES 29–35

Colored ink formulations were prepared using the following general procedure:

The carboxylic acid, ethanolamine (or substituted ethanolamine), polyethyleneimine (or ethyleneamines) were weighed in a 400 mL wide-mouthed bottle. The mixture was stirred for 30 minutes at room temperature or until a clear solution was obtained. Polyethylene glycol, triethanolamine and carboflow were added into the mixture (along with other additives, as indicated), and stirred for 60 minutes. Dye was added and the mixture stirred for approximately 24 hr. The ink was filtered through 5 μm and 0.65 μm millipore filters, loaded into cartridges and pens and test-printed on different types of papers.

| Ex. |                          |   |        |
| --- | ------------------------ | - | ------ |
| 29. | d-Tartaric Acid          | = | 12 g   |
|     | Polyethyleneimine        | = | 6 g    |
|     | N-Methyl-2-pyrrolidone   | = | 12 g   |
|     | N,N-Dimethylethanolamine | = | 21 g   |
|     | Water                    | = | 30 g   |
|     | PEG (200, 400, 600)      | = | 30 g   |
|     | Triethanolamine          | = | 6 g    |
|     | Carboflow 22W            | = | 2 g    |
|     | Projet Magenta-1         | = | 180 mL |
|     | Total Volume             | = | 200 mL |

(Examples 29a–29d: The formulation of Example 29 was prepared substituting diethylenetriamine (Example 29a), triethylenetriamine (Example 29b), tetraethylenepentamine (Example 29c), and pentaethylenehexamine (Example 29d) for polyethyleneimine.)

|     |                          |   |      |
| --- | ------------------------ | - | ---- |
| 30. | d-Tartaric Acid          | = | 12 g |
|     | Polyethyleneimine        | = | 6 g  |
|     | N-Methyl-2-pyrrolidone   | = | 12 g |
|     | N,N-Dimethylethanolamine | = | 21 g |
|     | Water                    | = | 20 g |
|     | PEG (200, 400, 600)      | = | 20 g |
|     | Triethanolamine          | = | 6 g  |

| | | | |
|---|---|---|---|
| | Carboflow 22W | = | 2 g |
| | Propylene carbonate | = | 6 g |
| | Projet Magenta-1 | = | 174 mL |
| | Total Volume | = | 200 mL |

(Examples 30a–30d: The formulation of Example 30 was prepared substituting diethylenetriamine (Example 30a), triethylenetetramine (Example 30b), tetraethylenepentamine (example 30c), and pentaethylenehexamine (Example 30d) for polyethyleneimine.)

| | | | |
|---|---|---|---|
| 31. | d-Tartaric Acid | = | 12 g |
| | Polyethyleneimine | = | 6 g |
| | N-Methyl-2-pyrrolidone | = | 12 g |
| | N,N-Dimethylethanolamine | = | 20 g |
| | Water | = | 20 g |
| | PEG (200) | = | 20 g |
| | Triethanolamine | = | 6 g |
| | Carboflow 22W | = | 2 g |
| | Projet Cyan-1 | = | 171 mL |
| | Total Volume | = | 200 mL |

(Examples 31a–31d: The formulation of Example 31 was prepared substituting diethylenetriamine (Example 31a), triethylenetetramine (Example 31b), tetraethylenepentamine (example 31c), and pentaethylenehexamine (Example 31d) for polyethyleneimine.)

| | | | |
|---|---|---|---|
| 32. | d-Tartaric Acid | = | 12 g |
| | Polyethyleneimine | = | 12 g |
| | N-Methyl-2-pyrrolidone | = | 12 g |
| | N,N-Dimethylethanolamine | = | 21 g |
| | Water | = | 20 g |
| | PEG (200) | = | 20 g |
| | Triethanolamine | = | 6 g |
| | Carboflow 22W | = | 2 g |
| | Propylene carbonate | = | 6 g |
| | Projet Cyan-1 | = | 174 mL |
| | Total Volume | = | 200 mL |

(Examples 32a–32d: The formulation of Example 32 was prepared substituting diethylenetriamine (Example 32a), triethylenetetramine (Example 32b), tetraethylenepentamine (example 32c), and pentaethylenehexamine (Example 32d) for polyethyleneimine.)

| | | | |
|---|---|---|---|
| 33. | d-Tartaric Acid | = | 12 g |
| | Polyethyleneimine | = | 6 g |
| | N-Methyl-2-pyrrolidone | = | 12 g |
| | N,N-Dimethylethanolamine | = | 21 g |
| | Water | = | 20 g |
| | PEG (200) | = | 20 g |
| | Triethanolamine | = | 6 g |
| | Carboflow 22W | = | 2 g |
| | Projet Yellow-1 | = | 180 mL |
| | Total Volume | = | 200 mL |

(Examples 33a–33d: The formulation of Example 33 was prepared substituting diethylenetriamine (Example 33a), triethylenetetramine (Example 33b), tetraethylenepentamine (example 33c), and pentaethylenehexamine (Example 33d) for polyethyleneimine.)

| | | | |
|---|---|---|---|
| 34. | d-Tartaric Acid | = | 12 g |
| | Polyethyleneimine | = | 6 g |
| | N-Methyl-2-pyrrolidone | = | 12 g |
| | N,N-Dimethylethanolamine | = | 21 g |
| | Water | = | 20 g |
| | PEG (200) | = | 20 g |
| | Triethanolamine | = | 6 g |
| | Carboflow 22W | = | 2 g |
| | Propylene carbonate | = | 12 g |
| | Projet Yellow-1 | = | 168 mL |
| | Total Volume | = | 200 mL |

(Examples 34a–34d: The formulation of Example 34 was prepared substituting diethylenetriamine (Example 34a), triethylenetetramine (Example 34b), tetraethylenepentamine (example 34c), and pentaethylenehexamine (Example 34d) for polyethyleneimine.)

| | | | |
|---|---|---|---|
| 35. | d-Tartaric acid | = | 4 g |
| | Polyethyleneimine ethoxylated | = | 2 g |
| | Ammonia | = | 5 mL |
| | Polyethylene glycol | = | 8 g |
| | N-Methyl-2-pyrrolidone | = | 8 mL |
| | Projet Magenta 2 | = | 64 mL |
| | Total Volume with Water | = | 100 mL |

As with all of the ink compositions tested, each of the above colored formulations were found to have very good water fastness after drying on plain paper, and did not display any bleeding.

Additional experiments may be conducted repeating preparation of the above tararic acid-containing formulations, but substituting the following for d-tartaric acid: 1,2,4,5-benzenetetracarboxylic acid; 1,2,4-benzenetricarboxylic acid; oxalic acid; citric acid; tricarballylic acid; polyacrylic acid; glutamic acid; and α-malonic acid. The same results with respect to water-fastness are obtained.

We claim:

1. An ink composition comprising an aqueous liquid vehicle, an effective amount of an ionizable dye, and a binder matrix comprised of a monomeric polyacid and a monomeric polyamine ionically associated therewith, wherein the polyamine is selected from the group consisting of ethylenediamine, 1,2-propane diamine, 1,3-propanediamine, 1,2,3-triaminopropane, cis-1,2-cyclohexanediamine, trans-1,2-cyclohexanediamine, 1,3-bis (aminomethyl)cyclohexane, o-, m- and p-phenylenediamine, tetramethyl o-,m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, and triethylenetetraamine, and combinations thereof.

2. An ink composition comprising an aqueous liquid vehicle, an effective amount of a colorant, and a binder matrix comprising a monomeric polyacid having the structure of formula (I) and a monomeric polybase having the structure of formula (II)

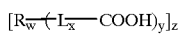
(I)

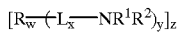
(II)

wherein:
R is selected from the group consisting of alkyl, alkenyl, aryl of 1 to 3 rings which may be fused or linked, and 5- and 6-membered heterocyclic rings having from 1 to 3 heteroatoms selected from N, S and O;

$R^1$ and $R^2$ are independently selected from the group consisting of hydrogen and lower alkyl;

L is an alkylene or alkenylene chain containing 1 to 8 carbon atoms;

w is 0 or 1;

x is 0 or 1;

y is an integer in the range of 2 to 10 inclusive; and z is 1, 2 or 3, with the provisos that (a) if w is 0 and x is 0, then y is 2 and z is 2, and (b) if z is 2 or 3, the distinct R groups are covalently linked to each other.

3. The ink composition of claim 2, wherein:

w is 1;

x is 0;

y is an integer in the range of 2 to 6 inclusive;

z is 1; and

R is alkyl of 1 to 12 carbon atoms substituted with 0 to 4 substituents, alkenyl of 2 to 12 carbon atoms substituted with 0 to 4 substituents and containing 1 or 2 double bonds, or aryl of 1 to 2 rings substituted with 0 to 4 substituents and either fused or linked.

4. The ink composition of claim 3, wherein:

w is 1;

x is 0;

y is 2, 3 or 4;

z is 1; and

R is alkyl of 1 to 8 carbon atoms substituted with 0 to 4 substituents, alkenyl of 2 to 8 carbon atoms substituted with 0 to 4 substituents and containing 1 double bond, or phenyl, wherein the substituents are selected from the group consisting of amino, hydroxyl, and combinations thereof.

5. The ink composition of claim 1, wherein the monomeric polybase is a polyamine selected from the group consisting of ethylenediamine, 1,2-propane diamine, 1,3-propanediamine, 1,2,3-triaminopropane, cis-1,2-cyclohexanediamine, trans-1,2-cyclohexanediamine, 1,2-bis(aminomethyl)cyclohexane, o-, m- and p-phenylenediamine, tetramethyl o-, m- and p-phenylenediamine, hexamethylenediamine, hexamethylenetetraamine, diethylenetriamine, tetraethylenepentamine, pentaethylenehexamine, pentamethyl diethylenetriamine, tris(2-aminoethyl)amine, 1,1,4,7,10,10-hexamethyl triethylenetetramine, tetramethyl-p-phenylenediamine, tetramethylethylenediamine, triethylenetetraamine, and combinations thereof.

6. The ink composition of any one of claims 1, 2 or 5, further including a humectant.

7. The ink composition of any one of claims 1, 2 or 5, further including polyethylene glycol.

8. The ink composition of any one of claims 1, 2 or 5, further including a viscosity modifier.

9. The ink composition of any one of claims 1, 2 or 5, further including a surface tension control agent.

10. The ink composition of any one of claims 1, 2 or 5, further including a solubilizing compound effective to provide a solution of the first and second components in the aqueous liquid vehicle.

11. A binder material comprised of a monomeric polyacid, a monomeric polybase ionically associated therewith to form a matrix, and an ionizable dye entrapped within the matrix, wherein the monomeric polyacid has the structure of formula (I) and the monomeric polybase has the structure of formula (II)

(I)

(II)

wherein:
R is selected from the group consisting of alkyl, alkenyl, aryl of 1 to 3 rings which may be fused or linked, and 5- and 6-membered heterocyclic rings having from 1 to 3 heteroatoms selected from N, S and O;

$R^1$ and $R^2$ are independently selected from the group consisting of hydrogen and lower alkyl;

L is an alkylene or alkenylene chain containing 1 to 8 carbon atoms;

w is 0 or 1;

x is 0 or 1;

y is an integer in the range of 2 to 10 inclusive; and z is 1, 2 or 3, with the provisos that (a) if w is 0 and x is 0, then y is 2 and z is 2, and (b) if z is 2 or 3, the distinct R groups are covalently linked to each other.

12. The binder material of claim 11, wherein:

w is 1;

x is 0;

y is an integer in the range of 2 to 6 inclusive;

z is 1; and

R is alkyl of 1 to 12 carbon atom substituted with 0 to 4 substituents, alkenyl of 2 to 12 carbon atoms substituted with 0 to 4 substituents and containing 1 or 2 double bonds, or aryl of 1 to 2 rings substituted with 0 to 4 substituents and either fused or linked.

13. The binder material of claim 12, wherein:

w is 1;

x is 0;

y is 2, 3 or 4;

z is 1; and

R is alkyl of 1 to 8 carbon atoms substituted with 0 to 4 substituents, alkenyl of 2 to 8 carbon atoms substituted with 0 to 4 substituents and containing 1 double bond, or phenyl, wherein the substituents are selected from the group consisting of amino, hydroxyl, and combinations thereof.

* * * * *